United States Patent
Nurmi et al.

(10) Patent No.: US 9,190,820 B2
(45) Date of Patent: Nov. 17, 2015

(54) CABLE GLAND PLATE

(75) Inventors: Aapo Nurmi, Sastamala (FI); Mika Hautamäki, Helsinki (FI)

(73) Assignee: TRELLEBORG INDUSTRIAL PRODUCTS FINLAND OY, Sastamala (FI)

( * ) Notice: Subject to any disclaimer, the term of this patent is extended or adjusted under 35 U.S.C. 154(b) by 409 days.

(21) Appl. No.: 13/805,426

(22) PCT Filed: Jun. 21, 2011

(86) PCT No.: PCT/FI2011/050598
§ 371 (c)(1),
(2), (4) Date: Mar. 5, 2013

(87) PCT Pub. No.: WO2011/161319
PCT Pub. Date: Dec. 29, 2011

(65) Prior Publication Data
US 2013/0161090 A1     Jun. 27, 2013

(30) Foreign Application Priority Data
Jun. 22, 2010  (FI) .................................. 20105720

(51) Int. Cl.
H02G 3/18     (2006.01)
H02G 3/22     (2006.01)
(Continued)

(52) U.S. Cl.
CPC ................. *H02G 3/22* (2013.01); *H02B 1/305* (2013.01); *H02G 15/013* (2013.01)

(58) Field of Classification Search
CPC ......... H02G 15/013; H02G 3/22; H05B 3/06; H02B 1/305
USPC ...... 174/24, 50.2, 66, 72 A, 153 G, 650, 652, 174/653, 656, 663, 668, 657; 248/56, 65; 16/2.1, 2.2
See application file for complete search history.

(56) References Cited

U.S. PATENT DOCUMENTS 2,732,226 A     1/1956  Brattberg
4,733,016 A *   3/1988  Twist et al. .................. 174/657
(Continued)

FOREIGN PATENT DOCUMENTS

CN         1232309 A     10/1999
DE   102005002597 B3      3/2006
WO       0237634 A1       5/2002

OTHER PUBLICATIONS

European Search Report for application No. EP 11 79 7670 mailed on Dec. 18, 2013.
(Continued)

*Primary Examiner* — Jenny L Wagner
*Assistant Examiner* — Pete Lee
(74) *Attorney, Agent, or Firm* — Hauptman Ham, LLP

(57) ABSTRACT

The invention relates to a cable gland plate for passing cables in a sealed fashion through a casing, such as the wall of a low voltage switchgear. The cable gland plate includes a substantially rectangular rigid frame (6) and, a set of gland elements (7,8,9) and a pressure unit (16). According to the invention, one pair of opposed edges (12) of the rigid frame includes slide bars (10); one pair of opposed edges of each gland element (7,8,9) includes slide posts (14) arranged to be fitted to the opposed slide bars; and the pressure unit (16) includes an actuator (35) carrying out two sequential pressure actions in such a way that the first pressure action presses the gland elements to each other in the lengthwise direction of the slide bars, and the second pressure action pushes the pressure unit against the frame and the adjacent gland elements.

9 Claims, 5 Drawing Sheets

(51) Int. Cl.
*H02G 15/013* (2006.01)
*H02B 1/30* (2006.01)

(56) References Cited

U.S. PATENT DOCUMENTS

| | | | | |
|---|---|---|---|---|
| 5,416,271 | A | * | 5/1995 | Birmingham et al. ........ 174/657 |
| 5,938,152 | A | * | 8/1999 | Kreutz ............................ 248/56 |
| 7,288,730 | B2 | * | 10/2007 | Habel et al. .................... 174/650 |
| 2005/0115733 | A1 | * | 6/2005 | Kreutz ........................ 174/65 R |

OTHER PUBLICATIONS

International Search Report mailed Aug. 29, 2011 for PCT/FI2011/050598.
Chinese Office Action dated Apr. 24, 2015.

* cited by examiner

--Prior Art--

CABLE GLAND PLATE

CROSS REFERENCE TO RELATED APPLICATION

This application claims the priority of Finnish Patent Application No. 20105720, filed on Jun. 22, 2010 in the PRH (Finnish Patent and Registration Office). Further, this application is the National Phase application of International Application No. PCT/FI2011/050598 filed Jun. 21, 2011, which designates the United States and was published in Finnish.

FIELD OF THE INVENTION

The invention relates to the cable gland plate defined in the preamble of claim 1.

BACKGROUND OF THE INVENTION

Figure 1:
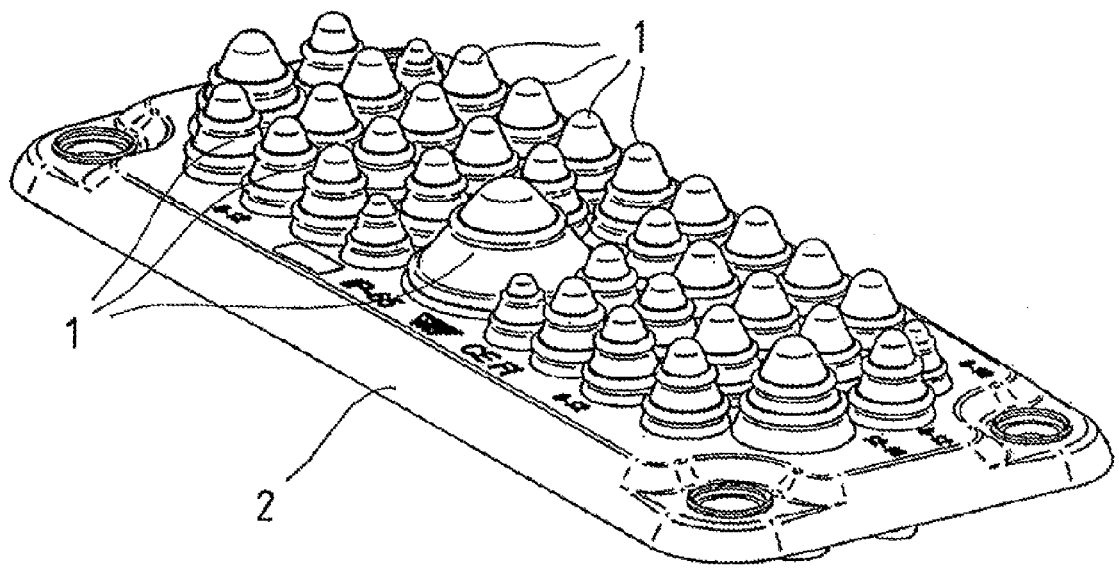

The known cable gland plates designed for several cables have a plate-type body with a set of holes, always one hole for one cable to be passed therethrough. The holes are covered or sealed with an elastic film, a rubber casing, which is to be punctured to push the cable through the hole, whereby the film becomes sealed against the surface of the cable due to the elasticity thereof, this way sealing the lead-through. One such known gland plate is illustrated in FIG. 1. The elastic films may be straight or, as illustrated in the figure, conical cups 1, and, in general, there are as many of them in the gland plate as is possible to accommodate on the surface thereof. Also, second seals may be disposed on the other surface of the plate in alignment with the lead-throughs, whereby double seals are obtained for the cables. In general, one of the seals is a closed cone as shown in the figure, and an open truncated cone is provided on the other side.

The cable gland plates as illustrated in FIG. 1 are very functional and effective compared with the traditional gland plugs which were used by making a proper hole for each cable and a proper plug was placed therein in order to seal the lead-through. However, even the plate illustrated in FIG. 1 is problematic. The plate is manufactured by pouring the rubber material to be used into a mold made specifically therefor. Thus, a proper mold is needed for each different plate structure. However, the applications are unique, so the sizes of the cables may vary in such a way that a lead-through of a suitable size for all cables may not be found from one plate in a specific application. In this case, two separate gland plates, or one or more traditional single-cable plugs in addition to the plate, must be used. Despite, quite a few different models of the plates must be manufactured to be able to complete even most of the applications by just one gland plate.

Attempts have been made to remedy the above-described problems by the solution according to patent application EP0245223. Therein, a set of sealing glands are supported against a rectangular frame and finally pressed together to form a tight assembly. However, the structure has been developed for heavy industrial use and is not applicable for example to pass through electric and data transfer cables in electrical enclosures and equivalent applications. The gland plate must be constructed one gland unit at a time, whereby a work project including many small cables is slow to carry out. In addition, the structure must be made heavy and large to be able to stay in the correct shape and hence tight. The pressure by the sealing units pushes the sides of the frames from the middle outwards, unless the frame is very rigid.

OBJECTIVE OF THE INVENTION

An objective of the invention to eliminate the drawbacks of the prior art referred to above. In particular, an objective of the invention is to disclose a structurally and functionally new type of a cable gland plate that can be flexibly fitted and adapted for different applications. Furthermore, an objective of the invention is to disclose a cable gland plate that is less expensive in manufacturing costs than the current equivalent plates. In addition, an objective of the invention is to disclose a lightweight cable gland plate that keeps its shape under pressure and is simple and easy to use.

SUMMARY OF THE INVENTION

In regard of the features characteristic of the cable gland plate according to the invention, reference is made to claim 1.

The cable gland plate according to the invention is designed for passing cables in a sealed fashion through a casing, such as the wall of a low voltage switchgear. The cable gland plate includes a substantially rectangular rigid frame and, within the space delimited by the frame, a set of gland elements and a pressure unit in order to press the gland elements tightly against each other and the frame. According to the invention, one pair of opposed edges of the rigid frame includes slide bars. Preferably, the frame is a rectangle, whereby the slide bars are located at the longer edges of the frame. Furthermore, one pair of opposed edges of each gland element includes slide posts arranged to be fitted to the opposed slide bars. In addition, the pressure unit includes a pressure member effecting two sequential pressure actions. As a result, the first pressure action presses the gland elements to each other in the direction of the slide bars, and the second pressure action pushes the pressure unit against the frame and the adjacent gland elements. This way, the pressure of the gland elements to their position and against each other does not take place in the invention as a pressure simultaneously effected in different directions, but first as a pressure only exactly in the direction of the slide bars, and secondly as a perpendicular pressure against the frame. This way, the slide bars stay straight and do not expand outwards.

Preferably, the actuator is a bolt or a screw, provided with threads, which is to be continuously turned in the same direction to sequentially perform the first and the second pressure action.

Preferably, the first pressure action is constituted by an expansion member expandable in the lengthwise direction of the slide bars, such as a suitable bellow structure, arranged to be pressed from the middle by the actuator in such a way that the dimension thereof in the lengthwise direction of the slide bars increases.

In the invention, the slide bars and the slide posts suitably include mutually corresponding sealing profiles to allow the movements of the gland elements in the slide bars only in the lengthwise direction thereof, the profiles being sealed and tightly pressed to each other when the gland elements are pushed and pressed against each other in the lengthwise direction of the slide bars.

The mainly elastic material of the gland elements provides for a pressure locking thereof in the lengthwise direction of the slide bars without significantly expanding in the cross direction of the slide bars.

Both opposed slide bars have, opposite and in alignment with each other, an installation gap, i.e. a suitable opening wherefrom the gland elements can be accommodated to the slide bars. This installation gap may be disposed at either end or close to the end of the slide bars, but it is preferably disposed in the middle section thereof. When the gland elements have been accommodated to the slide bars via the installation gap, a free space is left in the installation gap, wherein the pressure unit can be accommodated.

When the pressure unit is disposed in its position, the movement in the lengthwise direction of the slide bars is constituted by the first pressure action, i.e. by the expandable expansion member, which pushes the gland elements tightly against each other. When the gland elements are pressed to each other, the pulling by a pulling member constituting the second pressure action is effected, downwardly pushing the pressure unit toward the slide bars and the adjacent gland elements. This way, the pressure unit operates bifunctionally, i.e. it first pushes the gland elements against each other in the direction of the slide bars, and secondly presses and seals itself in its position in such a way that the entire area delimited by the frame of the cable gland plate is sealed.

Hence, the cable gland plate can always be assembled in the invention from suitable gland elements according to the application. This way, the necessary number of lead-throughs of different sizes is obtained for the cable gland plate in such a way that all the cables can be passed through the same cable gland plate.

The number of lead-throughs in one gland element may vary, but there are preferably 1 to 5 of them located in one row as a band extending across the cable gland plate.

The cable gland plate according to the invention has considerable advantages compared with the prior art.

The number of lead-throughs of different sizes required by the application can always be formed to the plate according to the invention. It is quick and easy to construct. This way, additional and separate, individual glands are avoided. In addition, the electrician need not carry a large set of different cable gland plates, but a suitable number of frames and then a suitable number of different elements suffice for the electrician to assemble the needed combination. Since the pressure forces employed in the invention are strictly controlled and directed, the cable gland plate can be made light and small-sized, which significantly facilitates the handling thereof and lowers the manufacturing costs. Furthermore, the cable gland plate according to the invention is easy and simple to assemble, install and seal in difficult and even narrow installation sites, because the mounting and sealing do not require complicated different operations. At the simplest, just screwing one screw or bolt from an open position to a closed position can be carried out as sequential operations.

LIST OF FIGURES

Figure 2:
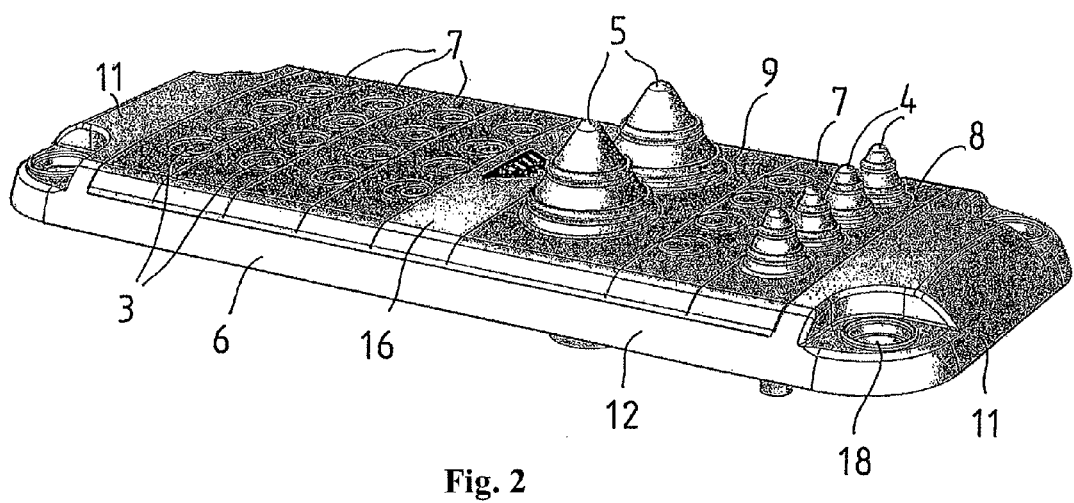
Figure 3:
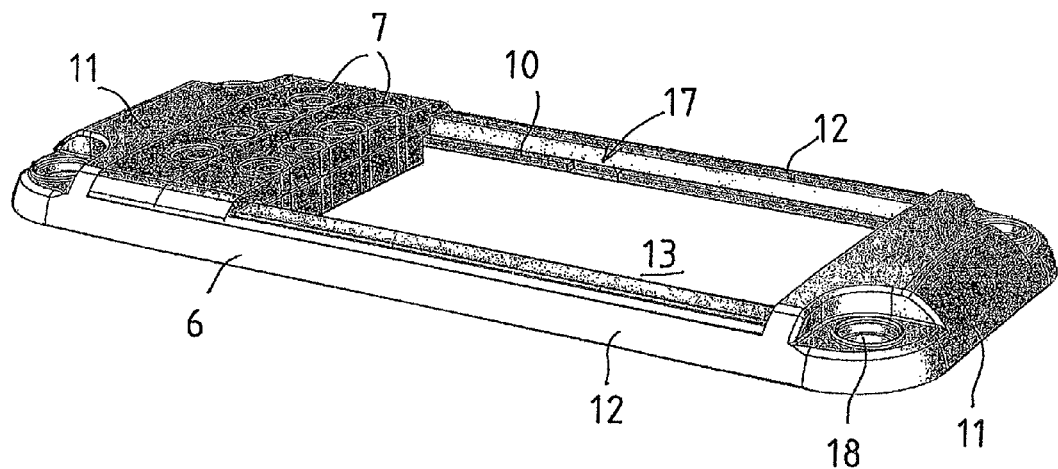
Figure 4:
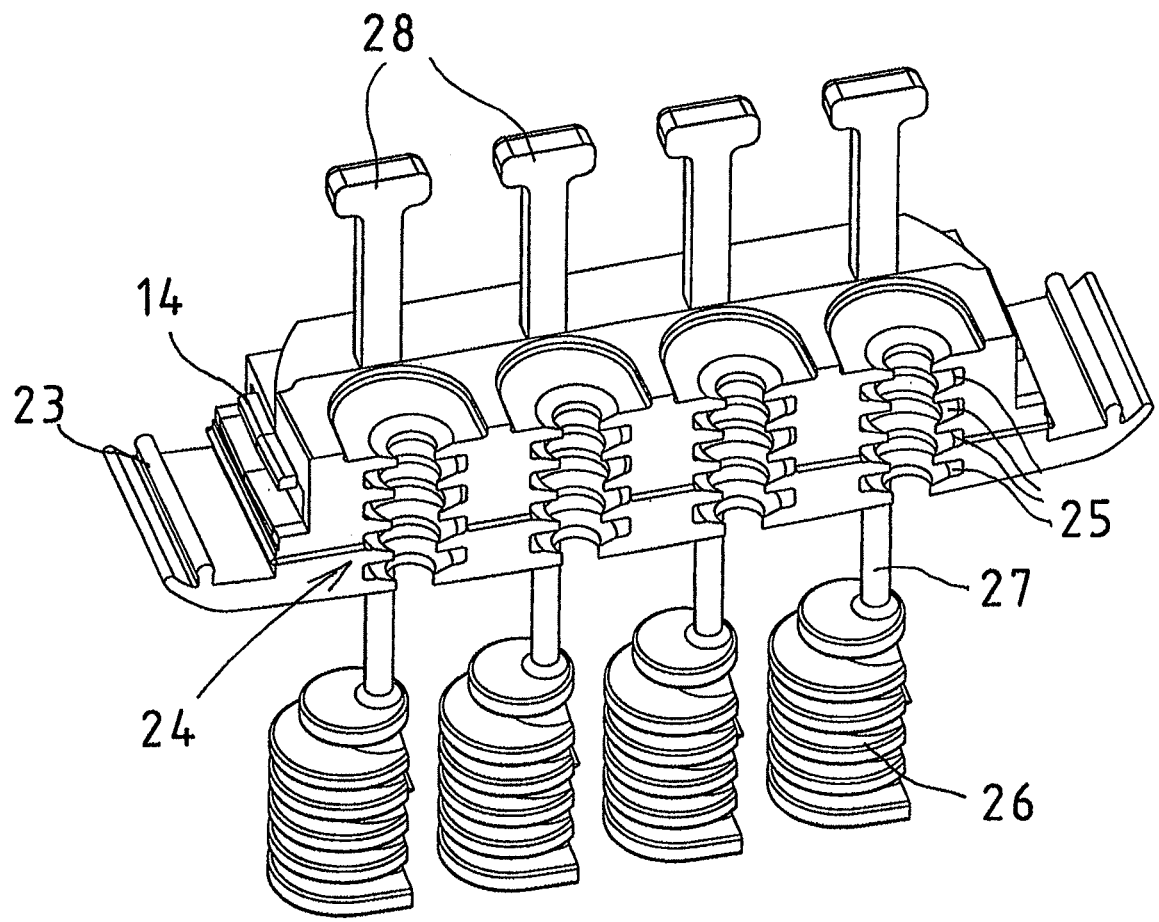
Figure 5:
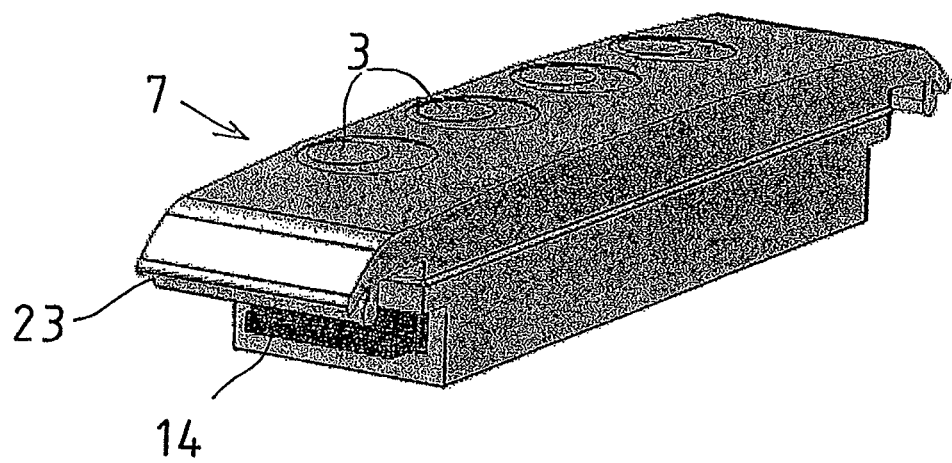
Figure 6:
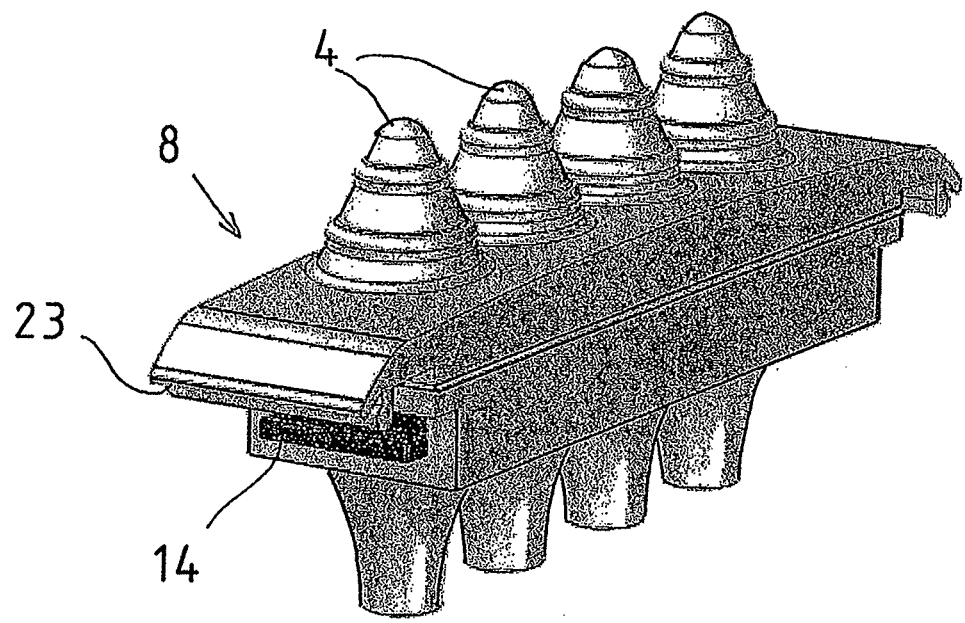
Figure 7:
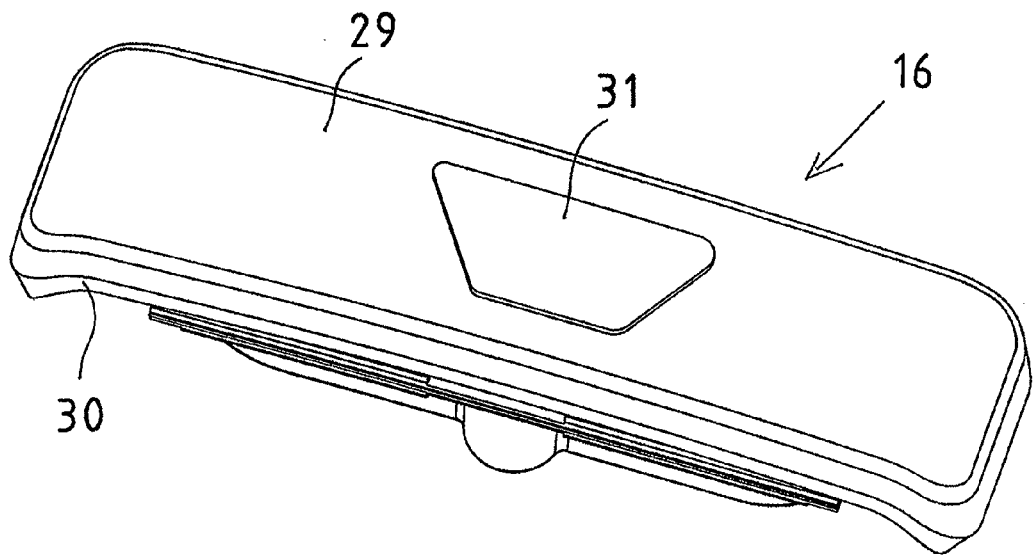
Figure 8:
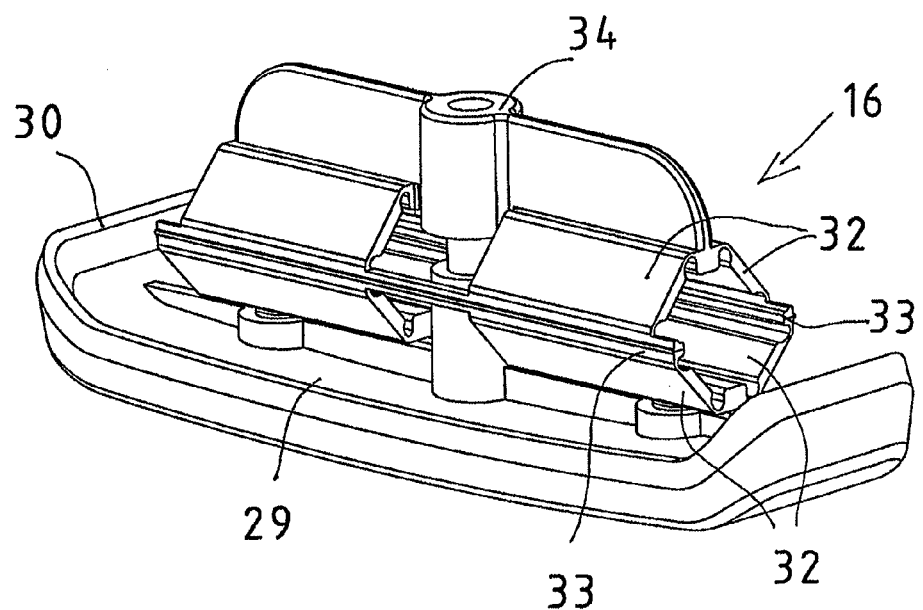

In the following section, the invention will be described in detail with reference to the accompanying drawings, in which FIG. 1 illustrates one known cable gland plate, FIG. 2 illustrates one cable gland plate according to the invention, FIG. 3 illustrates the cable gland plate of FIG. 2 in a partially assembled configuration, FIG. 4 illustrates one gland element according to the invention, FIG. 5 illustrates one gland element of the cable gland plate of FIG. 2, FIG. 6 illustrates a second gland element of the cable gland plate of FIG. 2, FIG. 7 illustrates one pressure unit according to the invention as seen from the top and FIG. 8 illustrates the pressure unit illustrated in FIG. 7 as seen from below.

DETAILED DESCRIPTION OF THE INVENTION

FIG. 1 illustrates the traditional cable gland plate having a large number of cups 1 of different sizes functioning as cable glands and mounted to a common frame 2. This way, they form one integral assembly.

FIG. 2 illustrates one cable gland plate according to the invention. It includes a substantially rectangular rigid frame 6 having mounting holes 18 at the corners thereof. The frame is formed by end blocks 11 and by edge beams 12 connecting them. Supported between the end blocks 11 against the edge beams 12 is a set of gland elements 7,8,9. The first gland elements 7, there being five of them, have four planar lead-throughs 3 in a row designed for relatively thin cables or lines. The second gland element 8 has four conical lead-throughs 4 in a row designed for slightly larger cables. The third gland element 9 has only two conical lead-throughs 5 designed for clearly larger cables.

The width of the elements, i.e. the dimension thereof in the lengthwise direction of the edge beams 12, is so provided that the first and the second element are equally wide and the width of the third element is double. This way, the elements can be easily provided to the frame in such a way that an equally wide empty space always remains therebetween. This empty space accommodates a pressure unit 16, which is only schematically illustrated in FIG. 2. The pressure unit 16 is expandable in the direction of the edge beams 12 in such a way that the elements 7,8,9 become pressed against each other.

The structure of the pressure unit 16 may vary in different embodiments. One preferred solution is illustrated in FIGS. 7 and 8. Also other pressed, pushed, screwed or equivalent structures with the two-stage sealing according to the invention are possible.

FIG. 3 illustrates the cable gland plate of FIG. 2 as an only partially assembled configuration. The end blocks 11 and edge beams 12 form therebetween a free space 13 wherein the gland elements 7,8,9 can be installed. The inner surfaces of the edge beams 12 include slide bars 10. The slide bars have an opening, i.e. an installation gap 17, in the middle of the edge beams 12. Via this opening, the gland elements 7,8,9 can be installed against the slide bars 10.

As shown in FIGS. 4,5 and 6, both ends of the gland elements 7 and 8 have corresponding projections for the slide bars 10, i.e. short slide posts 14, just fitted to move from the installation gap 17 in the transverse direction downward to the underside of the slide bars 10.

FIG. 4 illustrates one gland element applicable to be used in the cable gland plate according to the invention. It includes, between the slide posts 14 and sealing tongues 23 at the ends, an area having four lead-throughs disposed at the edge of the element. The lead-through has a hole 24 extending therethrough and is also open to the side of the element. The casing of the hole is grooved, i.e. it has four annular grooves 25. Furthermore, the element has, for each hole, a proper elastic plug 26 with a grooved casing. The plug is joined to the element by a flexible arm 27 in such a way that it can be tightly placed, if necessary, i.e. when the lead-through in question is not needed, in its position to the corresponding hole. The gland element also has on the underside, i.e. on the top in the figure, in alignment with each hole, a tie peg 28 to which the cable that has been passed through can be tied for example by a cable tie.

When a sufficient number of suitable and necessary gland elements have been passed from the installation gap to both sides thereof against the bars, a band, only approximately equally wide as the installation gap, is left in the middle. For example the pressure element 16 as illustrated in FIG. 7 can be accommodated here. The bar mounting is not needed for the pressure element 16 because it is not subject to any perpendicular forces generated by pulling the cable, such as received by the bars when cables are pushed into or pulled through the lead-throughs.

FIGS. 7 and 8 illustrate one pressure element 16 according to the invention, providing for the two-stage pressure and fastening. The pressure element includes a body plate 29 having a substantially flat upper surface. The edge of the body plate is encased by a downward oriented seal 30. The upper surface also has a cover lid 31, under which is disposed the end of a bolt 35 carrying out the tightening action. Supported to the lower surface of the body plate there is an articulated quadrilateral formed by four plate-type rigid pieces 32. The bolt disposed under said cover lid 31 extends from the body plate 29 to a threaded socket 34 through two opposed articulations of the articulated quadrilateral. This way, by turning the bolt, the rigid plate-type pieces 32 form a square having a cross section in the middle area thereof as illustrated in the figure or a vertical or horizontal diamond shaped cross-section.

The pressure element 16 of FIG. 8 functions in the following way. When the gland elements are in their position on the frame 6, the pressure element 16 is placed in the remaining space, the plate-type pieces 32 being vertically bent to such extent that they fit well in the slot in question. The seal 30 of the body plate 29 is pushed against the frame 6 at the ends and against the top surface of the adjacent gland elements at the edges. Next, the bolt 35 is tightened, whereby, in the first pressure action, the plate-type pieces in the direction of the screw approach each other, i.e. the horizontally coplanar articulations 33 thereof recede form one another and push against the adjacent gland elements. This way, they push and press the gland elements tightly against each other onto the frame. When turning of the bolt is continued, the second pressure action takes place, i.e., finally, the bolt pulls the body plate 29 tightly against the frame 6 and the top surface of the adjacent gland elements while the seal 30 is being pressed therebetween. This way, by double action, the gland elements are first provided tightly in their position, and then the pressure element is sealed.

This double action is an essential feature in the structure because simultaneous pressure effected in two directions would not guarantee secure tightness for each seam. FIG. 8 illustrates only one preferred embodiment of the invention, and the double action is also possible by different eccentric and screw structures. In the best embodiment of the invention of FIG. 8, the two different actions are combined in the same bolt in such a way that the user need not separate the two steps from each other. It suffices that the user just turns the bolt enough, whereby the pressure actions automatically take place sequentially.

It should be noted that all gland elements have, on both edges of the upper surface, sealing tongues 23 which tightly push against the edge beams 12. When the lengthwise sealing of the gland elements 7,8,9 against each other and the end blocks 11 is carried out by the pressure element 16, and when finally the pressure element is pressed downward against the gland elements adjacent thereto, the entire gland plate constitutes a tight assembly.

The figures only illustrate particular glands being used. In the invention, the individual glands may, however, vary freely according to need. Thus, the glands may be planar, slightly elevated, conical, truncated cones etc., and there may be one or two of them in the same lead-through. In addition, a gland element, such as the element 7 in the figures, may include glands to be passed from the side. These are particularly preferred when a connector or other part which is significantly larger than the cable has already beforehand been installed to the end of the cable to be passed. In this case, the cable cannot be passed anymore through the cone of a normal gland.

The invention is not limited merely to the examples referred to above; instead, many variations are possible within the scope of the inventive idea defined by the claims.

The invention claimed is:

1. A cable gland plate for passing cables in a sealed fashion through a casing, the cable gland plate comprising:
   a substantially rectangular rigid frame, and,
   a set of gland elements disposed within a space delimited by the frame, and
   a pressure unit configured to press the gland elements tightly against each other and the frame,
   wherein
   one pair of opposed edges of the rigid frame includes slide bars; and
   one pair of opposed edges of each gland element includes slide posts arranged to be fitted to the slide bars;
   the pressure unit includes an actuator configured to carry out
      a first pressure action to press the gland elements to each other in a lengthwise direction of the slide bars, and
      a second pressure action to push the pressure unit, in a direction perpendicular to the lengthwise direction of the slide bars, against the frame and the adjacent gland elements; and
   the first and second pressure actions are sequential pressure actions.

2. The cable gland plate according to claim 1, wherein the actuator comprises a screw provided with threads to be continuously turned in the same direction to sequentially perform the first and the second pressure action.

3. The cable gland plate according to claim 1, further comprising an expansion member expandable in the lengthwise direction of the slide bars, and configured to perform the first pressure action.

4. The cable gland plate according to claim 3, wherein the expansion member comprises a bellow structure arranged to be pressed from a middle by the actuator in such a way that a dimension of the expansion member in the lengthwise direction of the slide bars is to be increased.

5. The cable gland plate according to claim 1, further comprising a pulling member configured to perform the second pressure action.

6. The cable gland plate according to claim 1, wherein the slide bars and the slide posts include mutually corresponding sealing profiles to allow movements of the gland elements only in the lengthwise direction of the slide bars.

7. The cable gland plate according to claim 1, wherein the gland elements comprise elastic material configured to provide a pressure locking of the gland elements in the lengthwise direction of the slide bars.

8. The cable gland plate according to claim 1, wherein
   each of the slide bars includes an installation gap,
   the installation gaps of the slide bars are opposite to and in alignment with each other, from which the gland elements are to be accommodated to the slide bars.

9. The cable gland plate according to claim 1, wherein the casing comprises a wall of a low voltage switchgear.

* * * * *